United States Patent [19]
Satomi et al.

[11] Patent Number: 5,226,037
[45] Date of Patent: Jul. 6, 1993

[54] LINE SWITCHING SYSTEM

[75] Inventors: Shigeki Satomi, Tokyo; Naoki Ono; Mami Oka, both of Kawasaki, all of Japan

[73] Assignee: Hitachi, Ltd., Tokyo, Japan

[21] Appl. No.: 753,721

[22] Filed: Sep. 3, 1991

[30] Foreign Application Priority Data

Sep. 7, 1990 [JP] Japan .................................. 2-235511

[51] Int. Cl.⁵ .............................................. H04L 1/22
[52] U.S. Cl. .................................. 370/16; 340/825.01; 371/8.2
[58] Field of Search ............... 340/825.01, 827; 455/8; 375/38; 371/8.2; 370/16, 16.1

[56] References Cited

U.S. PATENT DOCUMENTS

| | | | |
|---|---|---|---|
| 3,309,467 | 3/1967 | Gorgas et al. | 340/827 |
| 4,864,568 | 9/1989 | Sato et al. | 340/825.01 |
| 4,979,118 | 12/1990 | Kheradpir | 340/827 |
| 5,115,449 | 5/1992 | Lockyer et al. | 455/8 |

FOREIGN PATENT DOCUMENTS 2-60337  2/1990  Japan .

*Primary Examiner*—Benedict V. Safourek
*Attorney, Agent, or Firm*—Fay, Sharpe, Beall, Fagan, Minnich & McKee

[57] ABSTRACT

In a network system in which a line switching unit and the other line switching unit are connected with each other via communication lines and backup lines, and nodes which are connected with both the line switching units, respectively are adapted to communicate with each other via either one of the communication lines and backup lines and both line switching units, a line switching system wherein a network control unit is connected with the line switching units, said network control unit having, in a table, information on connecting mates of said communication and backup lines an information on a plurality of groups of communication lines each grouped based upon the former information, the network control unit being adapted to select a relevant group based upon the group information when a failure occurs in the communication lines for issuing an instruction for collectively switching a plurality of communication lines belonged to the group, whereby said line switching unit which has received the instruction performs switching to the relevant backup lines.

5 Claims, 22 Drawing Sheets

F I G. 2-1

| ITEM No. | LINE SWITCHING UNIT ON THE SIDE OF NETWORK NODE | | | | | | CONNECTING DESTINATION IN NORMAL TIME | | CONNECTING DESTINATION ON SWITCHING | | | |
|---|---|---|---|---|---|---|---|---|---|---|---|---|
| | NAME OF CONNECTING SOURCE | NO. OF CONNECTING DESTINATION | LINE SWITCHING UNIT | | LINE SWITCHING UNIT | | LINE No. | CONNECTION TERMINAL NAME | CONNECTION TERMINAL NAME | NO. OF CONNECTING DESTINATION | LINE SWITCHING UNIT | |
| | | | NAME | PORT | NAME | PORT | | | | | NAME | PORT |
| 1 | NETWORK NODE 400 | 03-111-0011 | 105 | 01 | 201 | 01 | 204a | TERMINAL 203a | TERMINAL 203a | 06-111-0011 | 202a | 01 |
| 2 | NETWORK NODE 400 | 03-111-0011 | 105 | 01 | 201 | 02 | 204b | TERMINAL 203b | TERMINAL 203b | 06-111-0012 | 202b | 01 |
| n | NETWORK NODE 400 | 03-111-0100 | 105 | 01 | 201 | n | 204n | TERMINAL 203n | TERMINAL 203n | 06-111-0100 | 202n | 01 |
| 2n | NETWORK NODE 400 | 03-111-0200 | 105 | 01 | 301 | n | 304n | TERMINAL 303n | TERMINAL 303n | 052-111-0100 | 302n | 01 |

FIG. 2-2

| ITEM No. | LINE SWITCHING UNIT ON THE SIDE OF NETWORK NODE ||||||| CONNECTING DESTINATION IN NORMAL TIME ||| CONNECTING DESTINATION ||| LINE SWITCHING UNIT ON SWITCHING ||
|---|---|---|---|---|---|---|---|---|---|---|---|---|---|---|
| | NAME OF CONNECTING SOURCE | NO. OF CONNECTING DESTINATION | LINE SWITCHING UNIT || | LINE SWITCHING UNIT || | LINE No. | CONNECTION TERMINAL NAME | CONNECTION TERMINAL NAME | NO. OF CONNECTING DESTINATION | NAME | PORT |
| | | | NAME | PORT | NAME | PORT | | | | | | | |
| 2n+1 | NETWORK NODE 200 | 06-111-0011 | 201 | 01 | — | — | 204a | TERMINAL 203a | TERMINAL 203a | 06-320-0011 | 202a | 01 |
| | NETWORK NODE 200 | 06-111-0011 | 201 | 02 | — | — | 204b | TERMINAL 203a | TERMINAL 203b | 06-520-0011 | 202b | 01 |
| | ~ | ~ | 201 | n | — | — | 204n | TERMINAL 203n | TERMINAL 203n | 06-820-0011 | 202n | 01 |
| 3n | NETWORK NODE 200 | 06-111-0100 | 201 | n+1 | 301 | 01 | — | — | TERMINAL 303a | 052-111-0011 | 302a | 01 |
| 3n+1 | NETWORK NODE 200 | 06-111-0011 | 201 | ~ | ~ | ~ | — | — | ~ | ~ | ~ | ~ |
| 4n | NETWORK NODE 200 | 06-111-0100 | 201 | 2n | 301 | 01 | — | — | TERMINAL 303n | 052-111-0100 | 302n | 01 |

FIG. 2-3

| ITEM No. | LINE SWITCHING UNIT ON THE SIDE OF NETWORK NODE ||||||| CONNECTING DESTINATION IN NORMAL TIME ||| CONNECTING DESTINATION ON SWITCHING ||||
|---|---|---|---|---|---|---|---|---|---|---|---|---|---|
| | NAME OF CONNECTING SOURCE | NO. OF CONNECTING DESTINATION | LINE SWITCHING UNIT |||  LINE SWITCHING UNIT ||| LINE No. | CONNECTION TERMINAL NAME | CONNECTION TERMINAL NAME | NO. OF CONNECTING DESTINATION | LINE SWITCHING UNIT ||
| | | | NAME | PORT | | NAME | PORT | | | | | NAME | PORT |
| 4n+1 | NETWORK NODE 300 | 052-111-0011 | 301 | 01 | | 201 | 01 | — | — | TERMINAL 203a | 06-111-0011 | 202a | 01 |
| 5n | NETWORK NODE 300 | 052-111-0100 | 301 | n | | 201 | n | — | — | TERMINAL 203n | 06-111-0100 | 202n | 01 |
| 5n+1 | NETWORK NODE 300 | 052-111-0011 | 301 | 01 | | — | — | 304a | TERMINAL 303a | TERMINAL 303a | 052-320-0011 | 302a | 01 |
| 6n | NETWORK NODE 300 | 052-111-0100 | 301 | n | | — | — | 304n | TERMINAL 303n | TERMINAL 303n | 052-820-0011 | 302n | 01 |

FIG. 3A

① SMALL GROUP 1

SMALL GROUP NAME [AREA D1 LINE FAILURE]

| ITEM No. | NAME OF TERMINAL OF CONNECTION | LINE No. | NO. OF CONNECTING SOURCE | NAME OF CONNECTING DESTINATION | REMARKS |
|---|---|---|---|---|---|
| 1 | 203a | 204a | 06-320-0011 | NETWORK NODE200 | |
| 2 | 203b | 204b | 06-520-0011 | NETWORK NODE200 | |

② SMALL GROUP 1

SMALL GROUP NAME [AREA D NODE FAILURE]   [AREA E NODE FAILURE]

| ITEM No. | NAME OF TERMINAL OF CONNECTION | LINE No. | NO. OF CONNECTING SOURCE | NAME OF CONNECTING DESTINATION | REMARKS |
|---|---|---|---|---|---|
| 1 | 203a | 204a | 052-111-0011 | NETWORK NODE300 | |
| 2 | 203b | 204b | 052-111-0012 | NETWORK NODE300 | |
| ⁝ | ⁝ | ⁝ | ⁝ | ⁝ | |
| n | 203n | 204n | 052-111-0100 | NETWORK NODE300 | |

③ SMALL GROUP 3

SMALL GROUP NAME [AREA B NODE FAILURE]

| ITEM No. | NAME OF TERMINAL OF CONNECTION | LINE No. | NO. OF CONNECTING SOURCE | NAME OF CONNECTING DESTINATION | REMARKS |
|---|---|---|---|---|---|
| 1 | 203a | 204a | 06-111-0011 | NETWORK NODE400 | |
| 2 | 203b | 204b | 06-111-0012 | NETWORK NODE400 | |
| ⁝ | ⁝ | ⁝ | ⁝ | ⁝ | |
| n | 203n | 204n | 06-111-0100 | NETWORK NODE400 | |
| n+1 | 303a | 304a | 052-111-0011 | NETWORK NODE400 | |
| ⁝ | ⁝ | ⁝ | ⁝ | ⁝ | |
| 2n | 303n | 304n | 052-111-0100 | NETWORK NODE400 | |

FIG. 3B

① GROUP NAME [LINE FAILURE(GROUP)]

| ITEM No. | NAME OF SMALL GROUP | REMARKS |
|---|---|---|
| 1 | AREA D1 LINE FAILURE | |
| 2 | AREA D2 LINE FAILURE | |
| ⋮ | ⋮ | |
| e | AREA Ee LINE FAILURE | |

② GROUP NAME [NODE FAILURE]

| ITEM No. | NAME OF SMALL GROUP | REMARKS |
|---|---|---|
| 01 | AREA B NODE FAILURE | |
| 02 | AREA D NODE FAILURE | |
| 03 | AREA E NODE FAILURE | |

(1) LINE DEFINITION SCREEN

LINE DEFINITION

| ITEM NO. | LINE SWITCHING UNIT ON THE SIDE OF NETWORK NODE | | | | | | CONNECTING DESTINATION IN NORMAL TIME | | CONNECTING DESTINATION ON SWITCHING | | | |
|---|---|---|---|---|---|---|---|---|---|---|---|---|
| | NAME OF CONNECTING SOURCE | NO. OF CONNECTING DESTINATION | LINE SWITCHING UNIT | | LINE SWITCHING UNIT | | LINE NO. | CONNECTION TERMINAL NAME | CONNECTION TERMINAL NAME | NO. OF CONNECTING DESTINATION | LINE SWITCHING UNIT | |
| | | | NAME | PORT | NAME | PORT | | | | | NAME | PORT |
| 1 | NETWORK NODE 400 | 03-111-0011 | 105 | 01 | 201 | 01 | 204a | TERMINAL 203a | TERMINAL 203a | 06-111-0011 | 202a | 01 |
| 2 | NETWORK NODE 400 | 03-111-0011 | 105 | 01 | 201 | 02 | 204b | TERMINAL 203b | TERMINAL 203b | 06-111-0012 | 202b | 01 |
| n | NETWORK NODE 400 | 03-111-0100 | 105 | 01 | 201 | n | 204n | TERMINAL 203n | TERMINAL 203n | 06-111-0100 | 202n | 01 |
| 2n | NETWORK NODE 404 | 03-111-0200 | 105 | 01 | 301 | n | 304n | TERMINAL 303n | TERMINAL 303n | 052-111-0100 | 302n | 01 |
| 6n | NETWORK NODE 344 | 052-111-0100 | 301 | n | — | — | 304n | TERMINAL 303n | TERMINAL 303n | 052-820-0011 | 302n | 01 |

FIG. 4-2

(2)-②, ③ SMALLER GROUP DEFINITION SCREEN

GROUP DEFINITION
GROUP NAME [AREA D NODE FAILURE]

| No. | NAME OF TERMINAL OF CONNECTION | LINE NO. | NO. OF CONNECTING SOURCE | NAME OF CONNECTING DESTINATION | REMARKS |
|---|---|---|---|---|---|
| 1 | 203a | 204a | 03-320-0011 | HOST 103 | |
| 2 | 203b | 204b | 03-520-0011 | HOST 103 | |
| 8 | 203n | 204n | 03-880-0011 | HOST 103 | |

(2)-① SMALL GROUP DEFINITION SCREEN

GROUP DEFINITION
GROUP NAME [AREA D1 LINE FAILURE]

| No. | NAME OF TERMINAL OF CONNECTION | LINE NO. | NO. OF CONNECTING SOURCE | NAME OF CONNECTING DESTINATION | REMARKS |
|---|---|---|---|---|---|
| 1 | 203a | 204a | 06-320-0011 | NETWORK NODE 200 | |
| 2 | 203b | 204b | 06-520-0011 | NETWORK NODE 200 | |

(3)-① LARGER GROUP DEFINITION SCREEN

GROUP DEFINITION
GROUP NAME [LINE FAILURE (GROUP)]

| No. | SMALLER GROUP NAME |
|---|---|
| 1 | AREA D1 LINE FAILURE |
| 2 | AREA D2 LINE FAILURE |
| • | AREA Ee LINE FAILURE |

FIG. 4-3

(3)-② LARGER GROUP DEFINITION SCREEN

| GROUP DEFINITION | | |
|---|---|---|
| GROUP NAME [NODE FAILURE] | | |
| No. | SMALL GROUP NAME | REMARKS |
| 1. | AREA B NODE FAILURE | |
| 2. | AREA D NODE FAILURE | |
| 3. | AREA E NODE FAILURE | |

FIG.4-2 (2)-② ↔

NODE FAILURE (4) SCREEN DISPLAYING ALL GROUPS

| LINE SWITCHING (GROUP) | | |
|---|---|---|
| No. | GROUP NAME | REMARKS |
| 1 | LINE FAILURE | |
| 2 | LINE FAILURE(GROUP) | |
| 3 | NODE FAILURE | |

FIG.4-2 (3)-① ↔

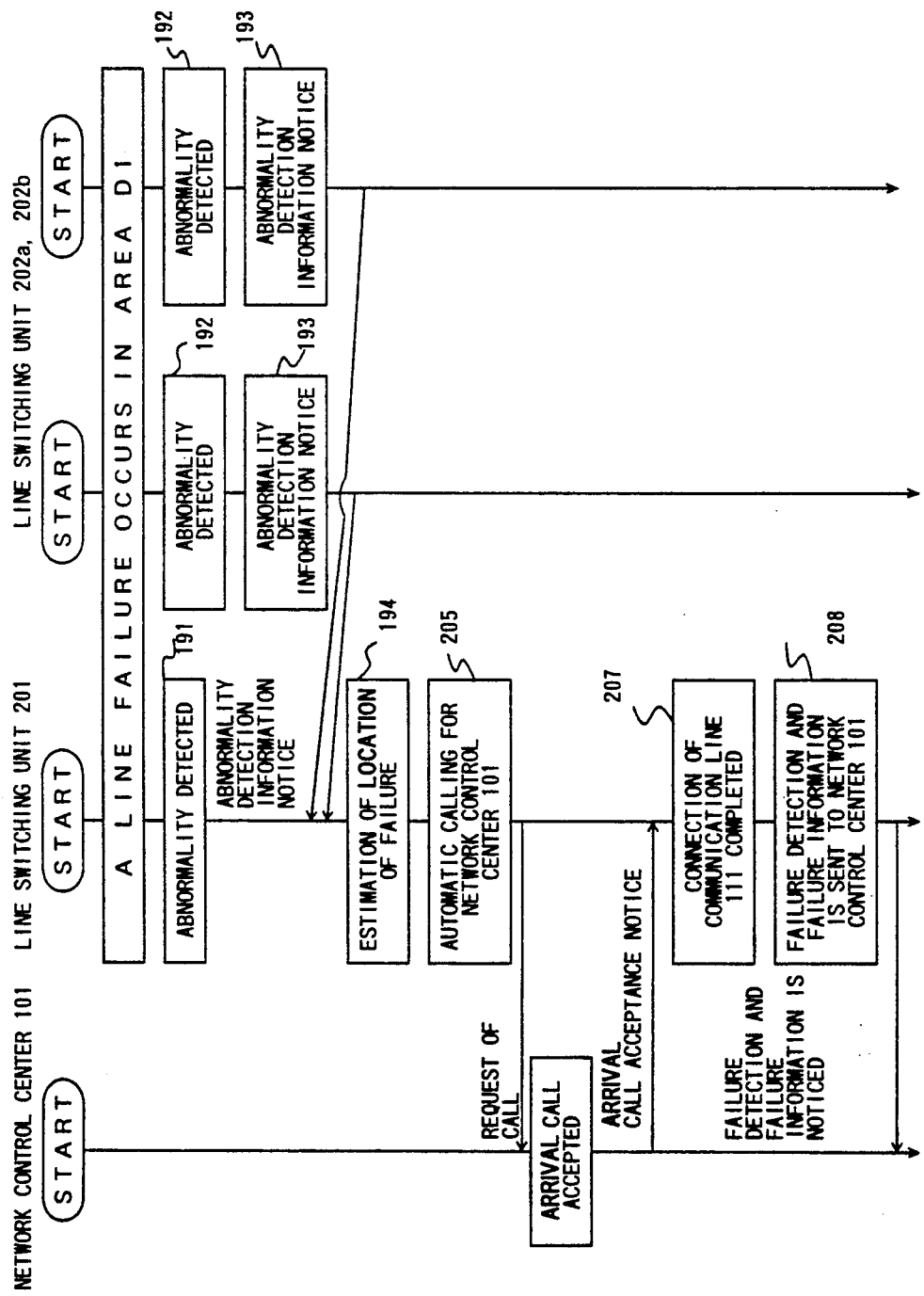

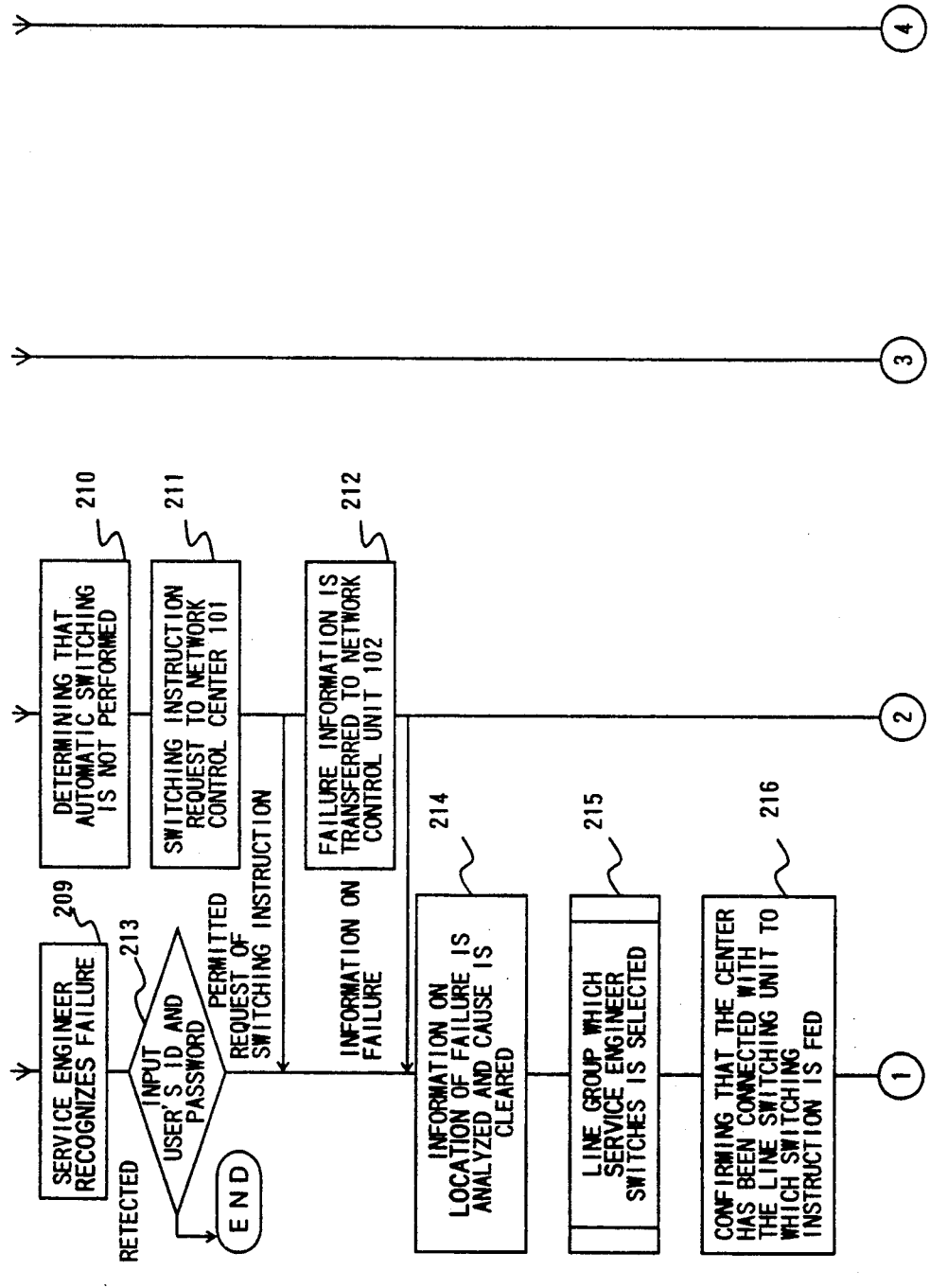

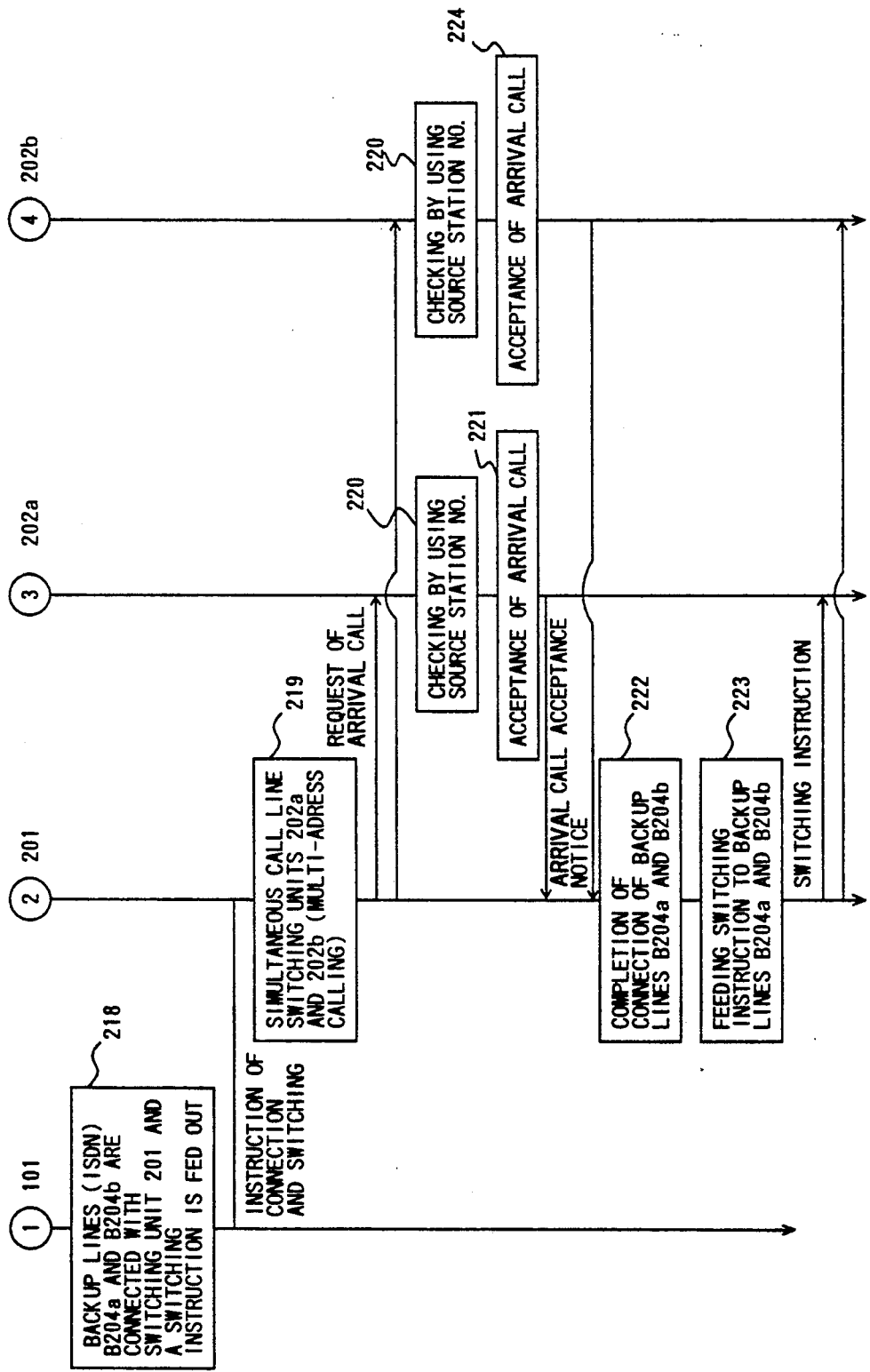

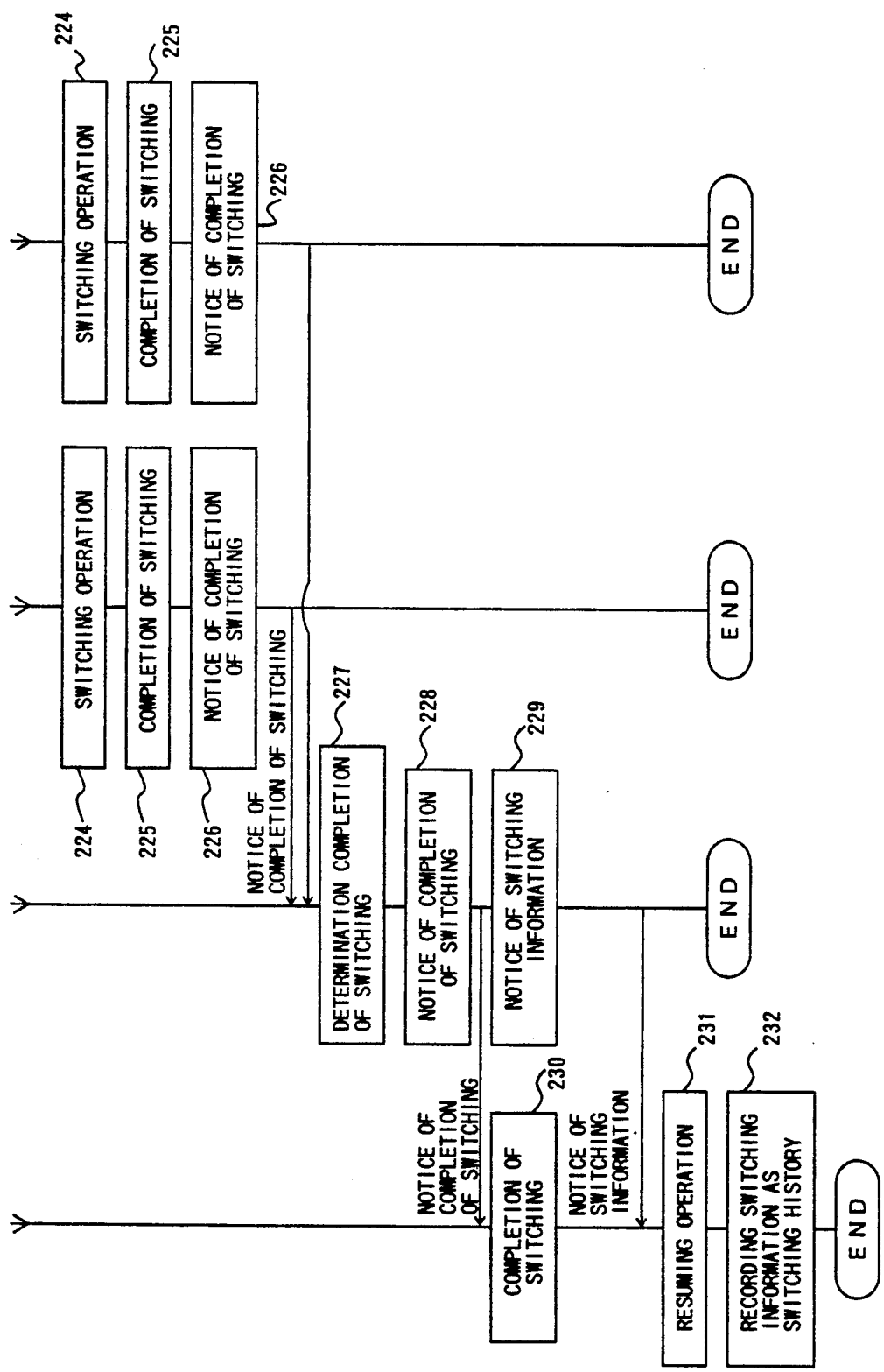

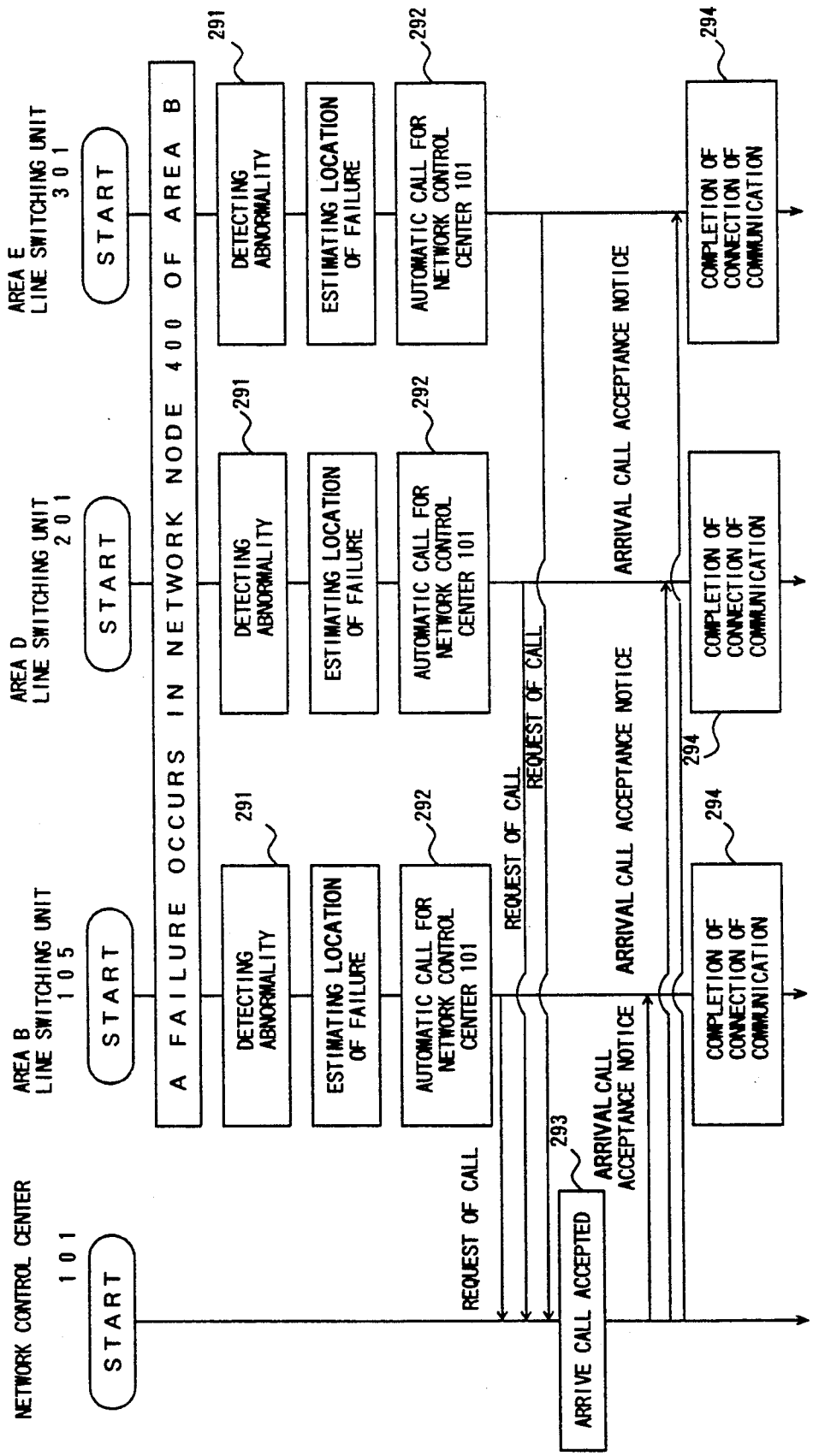

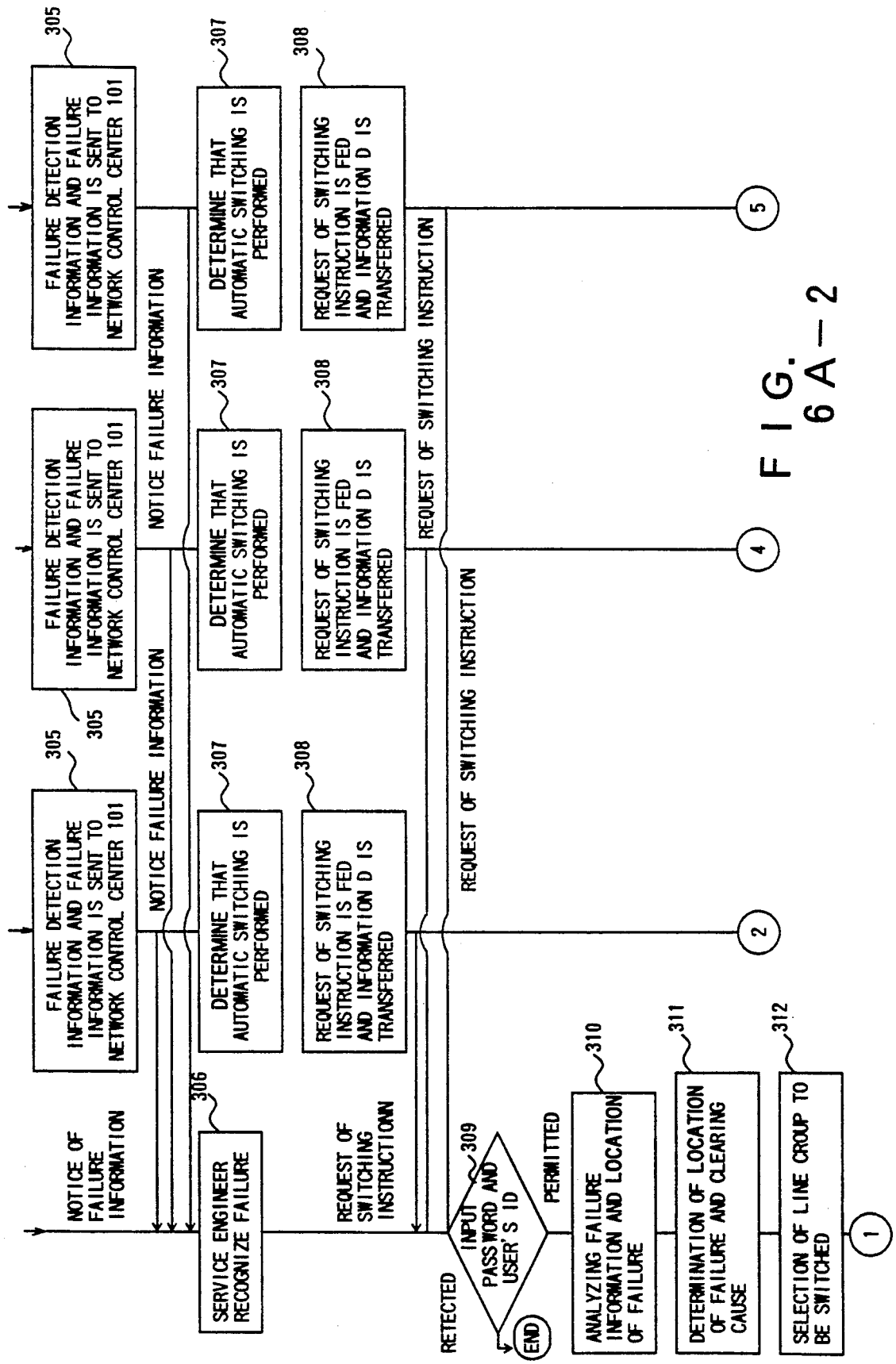

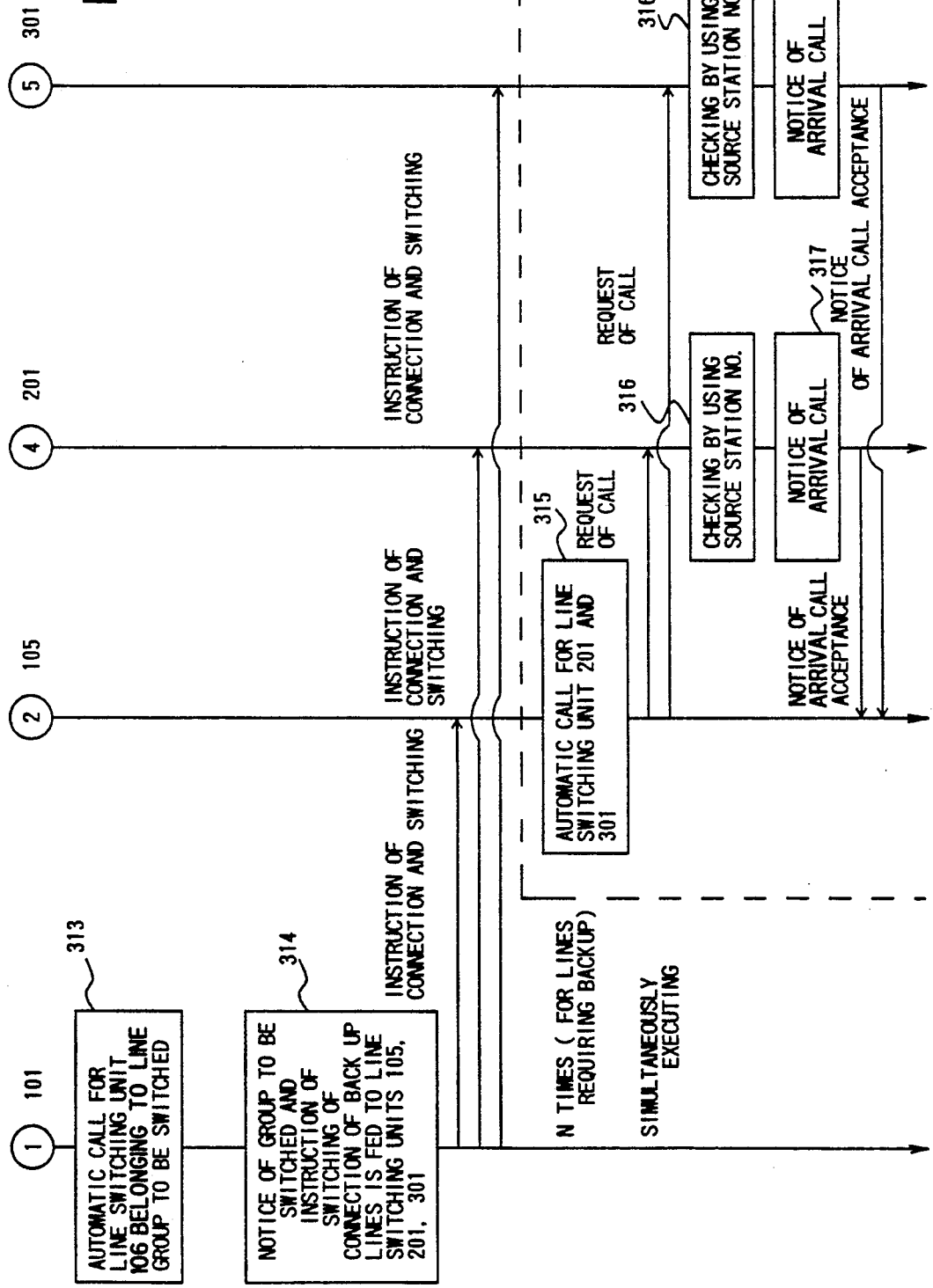

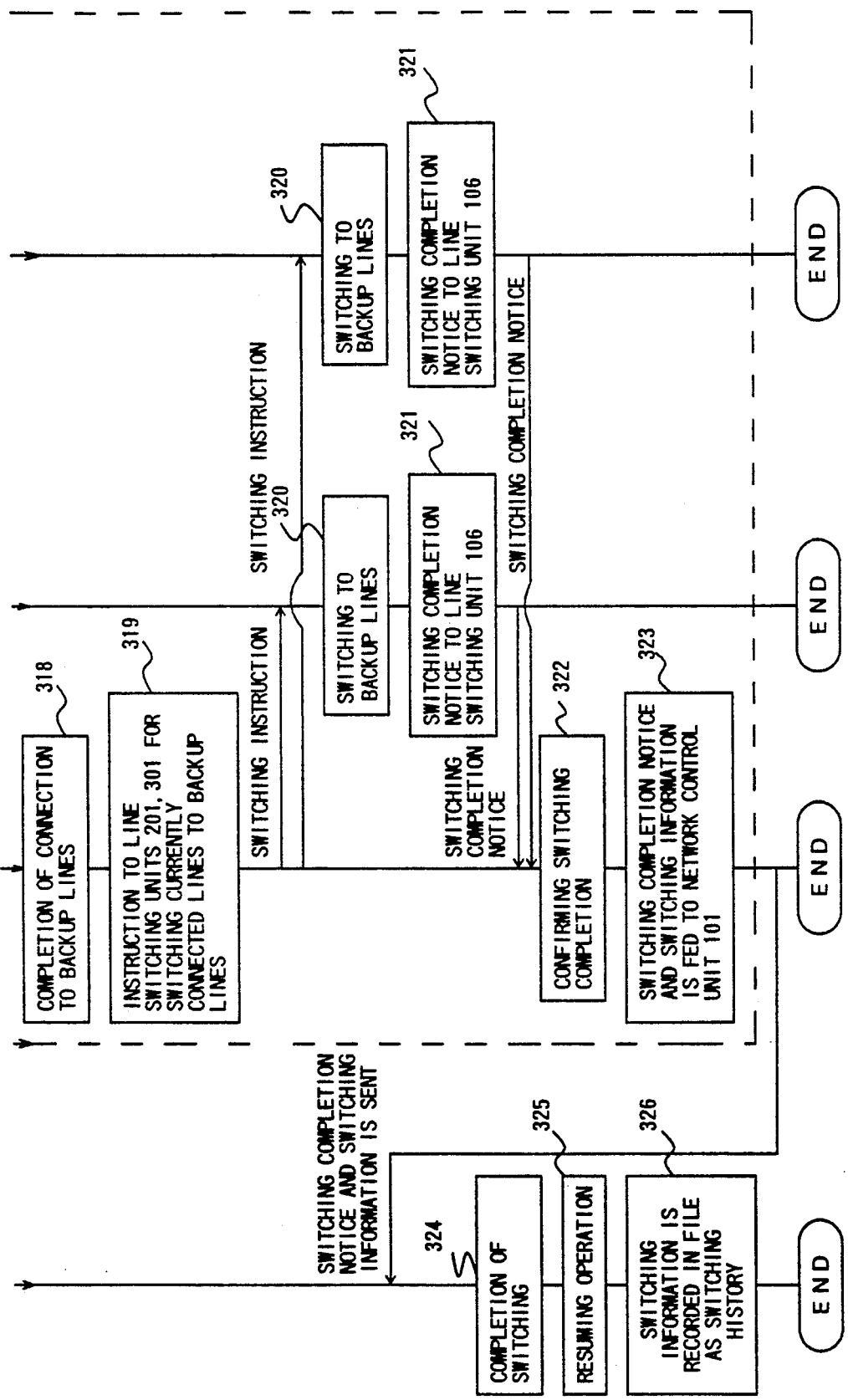

LINE SWITCHING SYSTEM

BACKGROUND OF THE INVENTION

The present invention relates to a system for switching lines when a failure occurs on a communication line of a network system and in particular to a line switching system for switching communication lines under a remote and centralized control of a network control center.

In a network system which couples computers at remote places for mutual communications, reliability of the network system is regarded as important. Countermeasures such as duplexing of units and switching of a faulty line to a backup line when a failure occurs have been taken.

JP-A-2-60337 discloses a line switching technique when a failure occurs on a communication line in a network system in which a plurality of computers are connected with each other via line switching units, communication lines and backup lines, and a network control center is connected with the line switching units. When the failure occurs, a line switching instruction is issued from the remote network control center to each of the line switching units. The line switching units which receive the instruction switch the faulty communication line to a backup line.

The above mentioned JP-A-2-60337 does not teach a method for estimating and displaying the location of failure and a scheme of the operation performed by the network control unit in the network control center in a network system in which a plurality of computers are connected with each other via line switching units, communication lines and backup lines and the network control unit is thereby connected with the line switching units, as mentioned above.

SUMMARY OF THE INVENTION

It is an object of the present invention to provide a network control unit of a network control center in the above mentioned network system, which network control unit has in a table, information on connecting mates (source and destination) of communication lines and backup lines and information on a plurality of groups of the lines, each being grouped based upon the former information and which is capable of selecting a relevant group based upon the information on the groups when a failure occurs on a communication line and feeding an instruction to the line switching units to collectively switch a plurality of communication lines belonging to the group.

In order to accomplish the above-mentioned object, in accordance with one aspect of the present invention there is provided a network system in which a line switching unit and an other line switching unit are connected with each other via communication lines and backup lines, and nodes which are connected with the line switching units, respectively are adapted to communicate with each other via either one of the communication lines and backup lines and the line switching units, a network control unit is connected with the line switching units, the network control unit having, in a table, information on connecting mates of said communication and backup lines and information on a plurality of groups of communication lines each grouped based upon the former information, the network control unit is adapted to select a relevant group based upon the group information when a failure occurs in the communication lines to thereby issue an instruction for collectively switching a plurality of communication lines belonging to the group, whereby a relevant one of the line switching units which has received the instruction performs switching of communication line in failure to the relevant backup line.

It is another object of the present invention to realize a centralized control of switching recovery of lines and simplification of switching operation by providing a network control system with capabilities of analyzing information on a failure provided from the line switching units, estimating or predicting the locations of the failure and displaying all the relevant positions of the failure on a screen.

In order to accomplish the object, in accordance with another aspect of the present invention, line switching units monitor the conditions of lines (between line switching units and between the line switching units and nodes) and nodes and detects a failure when it occurs and feeds failure information to a network control unit. The network control unit analyzes the failure information to predict the positions of the failure and displays the relevant positions of the failure and a plurality of switching patterns, so that accurate and fast switching of lines is realized. The line switching unit which detects the failure per se has a capability of predicting the positions of the failure and transmits the failure information to the network control unit and per se switches connected communication lines to backup lines.

In advantages of the present invention, a network control unit in a network control center collectively instructs each line switching unit to switch an unit of a plurality of line groups and provides a plurality of switching patterns, so that switching of lines in failure to backup lines can be centralizedly controlled from a remote place and the operation can be simplified.

BRIEF DESCRIPTION OF THE DRAWINGS

FIGS. 2-1, 2-2 and 2-3 show data formats for line definition;

FIGS. 3A and 3B are diagrams showing exemplary grouped line definition information;

FIG. 4-1, 4-2 and 4-3 are a diagram illustrating line and group definition by transition of a screen;

FIGS. 5A-1 and 5A-2, 5B-1 and 5B-2 are flow charts having a line switching operation;

FIGS. 6A-1, 6A-2, 6B-1, and 6B-2 are flow charts showing an operation for switching a host computer to sub-host computers;

FIGS. 7-1 and 7-2 are a diagram showing the transition of a display screen of a network control unit during the line switching operation;

FIGS. 9-1 and 9-2 are a flow chart showing an automatic line switching operation performed by a line switching unit.

DESCRIPTION OF THE PREFERRED EMBODIMENTS

Prior to description of the embodiments, the configuration of a network to which the present invention is applied and the functions of a network control unit and line switching units included therein will be described.

Figure 1:
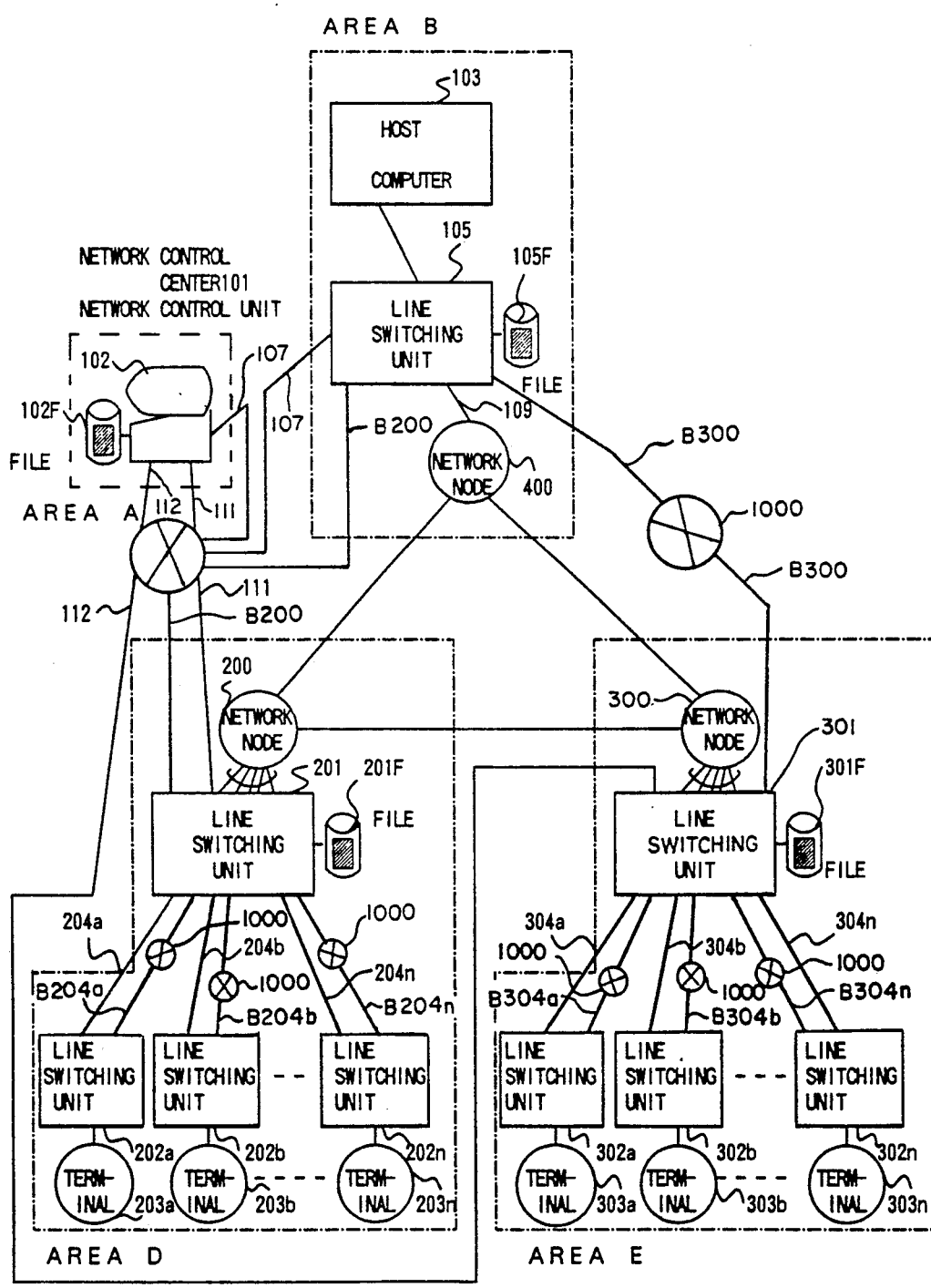
FIG. 1 is a diagram of a network configuration showing an embodiment of the present invention.

Referring now to FIG. 1, there is shown a block diagram of a network showing one embodiment of the present invention. A network control center 101 equipped with a network control unit 102 is provided in an area A. The network control unit 102 includes a personal computer and a work station, etc. and has a file 102F for registering the history of switchings. A host center equipped with a line switching unit 105 with which a host computer 103 and a file 105F are connected.

Terminals 203a to 203n and 303a to 303n and line switching units 202a to 202n and 302a to 302n are provided in areas D and E, respectively. The line switching units 202a to 202n and 302a to 302n in the areas D and E are connected with the line switching units 201 and 301, respectively. The line switching units 201 and 301 have files 201F and 301F, respectively.

The network control unit 102 in the area A is connected with the line switching units 105, 201 and 301 via communication lines 107, 111 and 112, respectively. The host computer 103 in the area B is connected with a network node 400 through the line switching unit 105 and the communication line 109. The terminals 203a to 203n and 303a to 303n in the areas D and E are connected with network nodes 200 and 300 via the line switching units 202a to 202n and 302a to 302n, communication lines 204a to 204n and 304a to 304n and the line switching units 201 and 301, respectively. Communication lines 204a to 204n and to 304a to 304n have associated backup lines B204b to B204n and B304a to B304n, respectively, the lines being part of a backup public network 1000 (i.e. phone network, ISDN etc.) or dedicated lines. The network nodes 200, 300 and 400 may include, for example, time-sharing multiplexers, packet switching units, communication controls, PBXs, and distributed computers and are connected with each other.

The line switching units may be included in terminals, the host computer, etc. The communication lines may be ISDNs, subscriber's telephone networks, DDX-Cs, leased circuits and the like. The terminals and the host computer may be generally referred to as "terminal nodes". The connection path between line switching unit 105 and line switching unit 201 is provided with a backup path including backup line B200 and a backup public network 1000.

The network control unit 102 has, in a table, information on connecting mates of the communication lines and backup lines and information on a plurality of groups of communication lines grouped based upon the first information. Such information and the table will be described in detail with reference to FIGS. 2 and 4.

The network control unit 102 receives failure detection information from the line switching units 105, 201 and 301, analyzes the information and predicts the locations of the failure and displays all relevant location of the failure and switching patterns. The network control unit 102 sends switching instructions to the line switching units which are included in the line groups to be switched by selecting the circuit groups to be switched. The line switching units which receive the switching instruction will carry out switching to the relevant backup line. The above-mentioned operation will be described with reference to FIGS. 5 and 6.

The line switching units 105, 201 and 301 monitor the conditions of the lines between the line switching units, and between the line switching units and the terminals (host computer) and of the terminals and the host computer to detect a failure if any and predicts the locations of the failure and sends the information on the failure to the network control unit 102 through the public circuit network (public telecommunication services such as D channel of ISDN) for displaying the information on a screen of the network control unit. The above-mentioned operation will be also described with reference to FIGS. 5 and 6.

If a given failure occurs, the line switching unit performs an automatic switching from the currently connected communication line to a relevant backup line based upon the information on the detected failure. The automatic switching is performed only when the condition of the automatic switching performed by the line switching unit filed in the file matches the information on the detected failure. If the condition does not match the information, the line switching unit switches to the relevant backup line in accordance with a switching instruction sent from the network control unit 102. The automatic switching performed by the line switching unit will be described with reference to FIGS. 8 and 9.

The operation system of the network control unit and operation of the network control unit and the line control units on switching of the lines will now be described in detail.

Figures 1, 7:
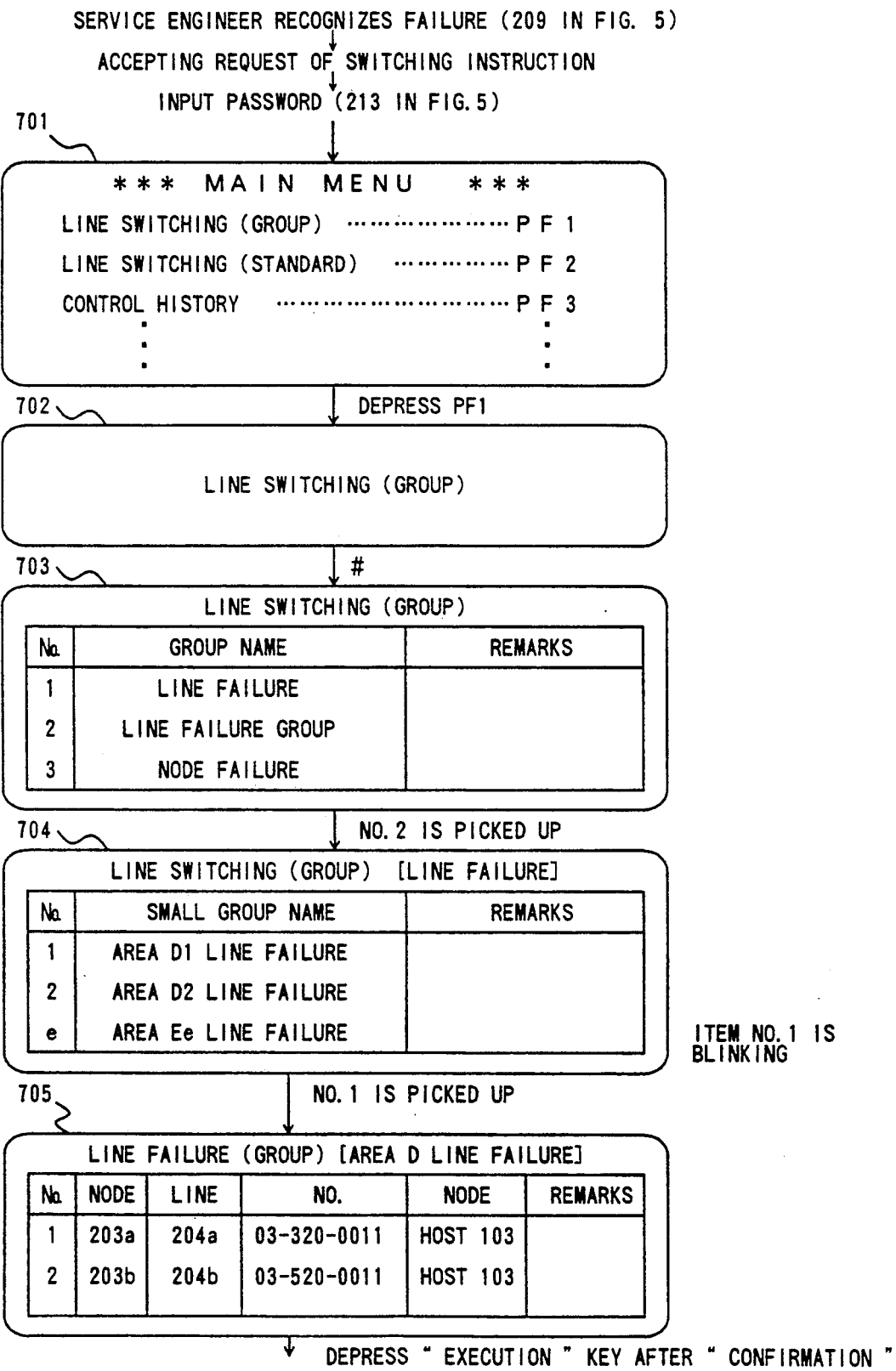
Figures 2, 7:
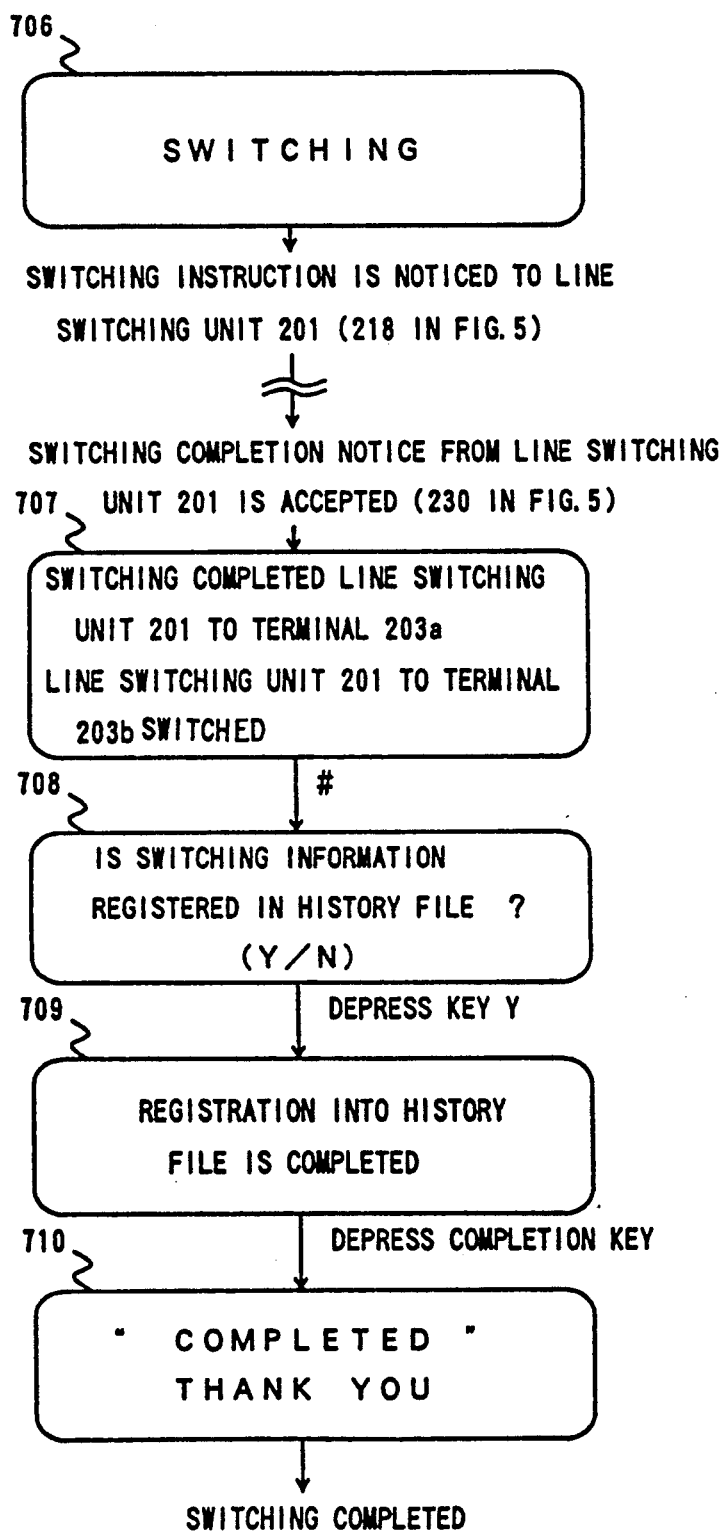

FIG. 2 shows an example of formats for line definition which is carried out on a display screen of the network control unit 102 in the network control center 101. The line definition is carried out, for example, by inputting information on the connecting mates or connecting source and destination on the normal operation or switching (backup) times prior to operation of the system by an maintenance service engineer. The communication lines are defined by specifying the line switching unit 105 which is connected with the network control unit 102 as a key item. An item number 1 defines the communication line 204a and represents that the network node 400 which is normally connected with the host computer 103 in the area B is a line which connects the terminal 203a in the area D via the line switching units 105, 201 and 202a. A backup line for a failure of the communication line 204a is represented to a connecting destination on switching represented by the item number 1. The backup line is an ISDN network which connects the host computer 103 in the area B with the terminal 203a in the area D via the line switching units 105, 201 and 202a as is similar to the communication line 203a and is connected by calling a number 06-111-0011.

The item numbers 1 to n and n+1 to 2n define the lines in consideration of backup in case of the occurrence of a failure in the network node 400. As the number of connecting destinations on switching, a number is designated when the line switching unit 105 calls the line switching unit 201 on line switching for the item numbers 1 to n. A number when the line switching unit 105 calls the line switching unit 301 on line switching is designated for the item numbers n+1 to 2n. As the number of connecting destinations on the side of the network node, a number which is used by the line switching unit 201 for source station number check in response to calling by the line switching unit 105 is designated for the item numbers 1 to n and a number which is used by the line switching unit 301 for the source station number check, is designated for the item number n+1 to 2n.

The item numbers 2n+1 to 3n defines the lines in consideration of the backup in case of the occurrence of a failure in the lines 204a to 204n. As the number of the end of connection on switching, a number when the line switching unit 201 calls the line switching units 202a to 202n is represented. As the number of connecting destinations of the line switching unit, a number when the line switching unit 201 calls the line switching units 202a to 202n is designated. As the number of the connecting destinations of the line switching unit on the side of network node, a number which is used by the line switching units 202a to 202n for source station number check in response to calling of the line switching unit 201 is designated.

The item number 3n+1 to 4n define the backup lines used by the network node 300 on a failure. It is assumed that the terminals 303a to 303n under control of the network node 300 be operated to perform communication via the nearest network node 200 by the failure in the network node 300. The number of connecting destinations on switching, a number used when the line switching unit 201 calls the line switching units 302a to 302n for switching lines is designated. As the number of connecting destinations of the line switching unit on the side of the network node, a number which is used by the line switching units 302a to 302n for checking a source station number in response to calling by the line switching unit 201 is designated.

Item numbers 4n+1 to 5n define the backup lines used on a failure in the network node 200. The number of connecting destination of the switching unit 301 is the same as that in case of the line switching units 202a to 202n for the item numbers 3n+1 to 4n.

The item numbers 5n+1 to 6n define the lines in consideration of backup in case of a failure in the lines 304a to 304n. The number of connecting destinations of the line switching unit 301 is the same as that in case of the line switching units 302a to 302n for the item numbers 2n+1 to 3n.

FIGS. 3A and 3B are diagrams showing lines defined in FIG. 2 which are grouped and defined in accordance with, for example, each pattern of the failure and areas. The lines in area D having the possibility of simultaneous occurrence of line failures are divided into groups D1, D2 . . . . One group of them represented by a reference numeral ①  in FIG. 3A is defined as a backup line on a failure of the line. Each of items such as name of terminal of connection is defined by the item relating to the lines shown in FIG. 2. A small group name "AREA D1 LINE FAILURE" is also registered in the example ①. The lines in the area E are similarly divided into groups E1, E2, . . . . Each of the groups is defined. The line failure in an area may include, for example, a failure of a station's building of the telecommunication service and a failure of communication equipment such as an exchange in a station. Reference numerals ② and ③ in FIG. 3A define backup lines for the failures in network nodes 200 and 400. If the network node 200 is faulty, communication can be made via the network node 300. If the network node 400 is in a failure, communication can be made without the network node 200, 300 or 400. Group names "AREA D NODE FAILURE" and "AREA B NODE FAILURE" are registered in examples ② and ③, respectively. In FIG. 3B, groups (large groups) including these groups (small groups) are defined. Reference numeral ① in FIG. 3B denotes large groups which include smaller groups relating to line failures. Large groups are defined as "line failures (groups)". Reference numeral ② denotes large groups including small groups relating to node failures Large groups are defined as "node failure".

FIGS. 4-1 to 4-3 are is a screen transition view showing the procedures of the definition of the lines and groups which have been described with reference to FIGS. 2 and 3. For example, lines are defined on a screen (1). (FIG. 4-1(1) illustrates a screen displaying data formats shown in FIGS. 2-1, 2-2, and 2-3). Then the lines are grouped in accordance with the failure pattern on screens (2)-①, ②, ③. At this time, the lines forming groups are selected from the lines defined in screen (1) for defining the screens (2)-①, ②, ③. The names of the groups are registered on screens (2)-①, ②, ③. (FIGS. 4-2 ①, ②, and ③ illustrate screens displaying data formats of FIGS. 3A-①, ②, and ③, respectively); Two small groups on the screen (2)-① are defined as one large group on a screen (3)-① to register the name of the large group. (FIG. 4-3 ① illustrates a screen displaying a data format of FIGS. 3B-②). Three small groups are defined as one large group to register the name of the large group on screen (3)-②. (FIG. 4-3 ② illustrates a screen displaying a data format of FIGS. 3B-②)--; and, All group names which have been registered are displayed on a screen (4). (FIG. 4-1(1), FIG. 4-2 (2)①, ②, FIG. 4-2(3)①, and FIG. 4-3(3)②.

A flow chart of an exemplary switching operation of the network control center and the line switching units when a failure occurs in the line in area D1 is shown in FIGS. 5A-1, 5A-2, 5B-1, and 5B-2 and 5B. A flow chart of an exemplary switching operation of the network control center and the line switching units when a failure occurs in the network node 400 in the area B is shown in FIGS. 6A-1 6A-2, 6B-1, and 6B-2.

Referring now to FIGS. 5A-1 through 5B-2 and 5B, the line switching unit 201 detects an abnormally (191). If the line switching unit 202a and 202b in the area D1 similarly detect the abnormality (192), they send abnormality detection notice and its information to the line switching unit 201 (193). The line switching unit 201 which receives the abnormality detection information makes an estimation of the location of the failure (194) (determines whether the failure is in the lines 203a or 204b or the network node 200) and automatically calls the network control center 101 simultaneously with this (205). The network control center 101 accepts the arrived call (206), and sends an arrived call acception notice. The line switching unit 201 accepts this notice, and ascertains the completion of connection of the communication line 111 (207) and then sends a failure detection notice and it's information to the network control center 101 (208). The network control center 101 receives the failure information notice so that the maintenance service engineer in the network control center 101 recognizes the failure (209). At this time, the line switching unit 201 determines whether automatic switching is carried out (210) and determines that the automatic switching is no carried out.

The line switching unit 201 feeds a switching instruction request to the network control center (211) and transfers the failure detection information to the network control unit and displays the information on the screen (212). The network control center has the service engineer input an user's ID and a pass word for restricting the service engineer operating the line switching (213). If permitted, switching operation is carried out. If not permitted, switching operation is rejected. If permitted, the service engineer analyzes the failure information displayed on the screen of the network control unit to locate the position of the failure and to clear up the cause (214). Then the service engineer carries out the selection of a line group to be switched (215). Operation of the network control unit when the group is selected will be described with reference to FIGS. 7-1 and 7-2.

The network control center confirms that it has been connected with the line switching unit 201 included in the circuit group to be switched (216) and feeds an instruction of connection of the backup lines B204 and 204b (218). Reference numerals B204a and B204b represent the backup lines of the communication lines 204a and 204b, respectively, that is, ISDN channels.

The line switching unit 201 receives this instruction and simultaneously calls (multi-address calling) the line switching units 202a and 202b (219). The line switching units 202a and 202b use the source station number to perform checking (220). After accepting the call, the units 202a and 202b transmit the arrived call acceptance notice. The line switching unit 201 receives the arrived call acceptance notice to confirm the completion of the connection of the backup circuit B204a and B204b (222). The line switching unit 201 feed to the line switching units 202a and 202b an instruction for switching to the backup lines B204a and B204b (223). The line switching units 202a and 202b performs an operation for switching to the backup lines B204a and B204b, respectively (224) and feed a switching completion notice to the line switching unit 201 (226) after the switching has been completed (225). When the line switching unit 201 receives the switching completion notice, it determines that the switching is completed (227) and feeds a switching completion notice to the network control center (228). The network control center receives this notice to determine that the switching is completed (230) and resumes the operation (231). Following this, the line switching unit 201 informs the network control center of the switching information such as switching position and switching time and the network control center records this information as switching history in the file 102F (232). The switch operation is thus completed.

Switching operation procedure when a failure occurs in the network node 400 in the area B will be described with reference to FIGS. 6-A-1 through 6B-2.

Now, the line switching units 105, 201 and 301 detect the failure and estimate the location of the failure based upon the failure information (determine whether the failure occurs in the network node 400 or host computer 103) (291), and makes an automatic call for the network control center 101 (292) and the network control center accepts the arrived call and sends an acceptance completion notice (293). The line switching units 105, 201 and 301 confirm completion of the connection of the communication lines 107, 111 and 112 between the line switching units and the network control center (294). The line switching units 105, 201 and 301 feeds to the network control center 101 a failure detection notice and failure information (305). The maintenance service engineer in the network control center recognizes the failure (306). The line switching units 105, 201, and 301 determines whether or not an automatic switching is performed and determines that an automatic switch is not performed this time (307). The line switching units feeds a switching instruction request to the network control center and transfers the failure information to the network control unit and displays it on the screen (308). After the network control center inputs the user's ID and the pass work for security checking (309), and analyzes the information on the failure displayed on the screen (310) for locating the failure position and clearing up the cause (311). Following this, the service engineer selects a line group to be switched (312) and informs the line switching units 105, 201 and 301 of the group of lines to be switched and sends an instruction to connect the backup lines (314). The line switching units 105 performs an automatic simultaneous calling (multi-address calling) for the line switching units 201 and 301 in the areas D and E in response to the connection instruction (314). The line switching units 201 and 301 use the source station number notice for checking (316) and feed an arrived call acceptance notice after acceptance of the arrived call (317). The line switching unit 105 receives this notice and confirms the completion of the connection of the backup lines (318). Following this, the unit 105 sends to the switching units 201 and 301 in the areas D and E an instruction to switch the currently connected communication lines to backup lines (319). The line switching units 201 and 301 receive the switching instruction to perform a switching operation and feed a switching operation completion notice to the line switching unit 105 (321). The line switching unit 105 receives a switching completion notice to confirm that the switching is completed (322), the feeds to the network control unit a switching completion notice and the switching information (323). The steps 315 to 323 are simultaneously executed for n lines which require backup.

The network control center ascertains the completion of the switching (324) and resumes the operation (325) and stores the received switching information as switching history in the file 102F (325).

The switching operation is thus completed.

Exemplary transition of displays on the screen of the console of the network control unit 102 in the network control center in the case where a failure occurs in the communication lines 204a and 204b which have been described with reference to FIGS. 5A-1 through 5B-2 and the lines between the line switching unit 201 and the terminal 203a and the lines between the line switching unit 201 and the terminal 203b are switched to the backup lines is shown in FIGS. 7-1 to 7-2.

The network control center 101 receives the information on the failure from the circuit switching unit 201 and the service engineer ascertains the failure (209) and receives a switching instruction request and inputs the user's ID and the pass word (213). At this time, "MAIN MENU" is displayed on the screen of the network control unit (701). "LINE SWITCHING (GROUP)" is selected to depress "PF1", the display is changed to a menu of "LINE SWITCHING (GROUP)" and the names of all the groups registered in "LINE SWITCHING (GROUP)" (703). "FAULTY LINE GROUP" is selected to pick up No. 2, small groups registered in "FAULTY LINE GROUP" are displayed (704).

If "FAULTY LINE GROUP IN AREA D1" is selected to pick up No. 1, the lines registered in the "FAULTY LINE GROUP" are displayed (705). If confirmation is made to depress a confirmation key, a message "DEPRESS EXECUTION KEY IF SWITCHING IS PERFORMED". Accordingly, if the execution key is depressed, "SWITCHING" is displayed (706). A switching instruction is fed to the line switching unit 201 (218 in FIG. 5) to commence the switching operation (219 to 229 in FIG. 5). The switching is completed and a switching completion notice from the line switching unit 201 is received (230 in FIG. 5) "SWITCHING COMPLETED" and the switching information is displayed (707). Since "IS SWITCHING INFORMATION RECORDED IN FILE AS SWITCHING HISTORY? Y/N" is displayed (708), a Y key is depressed to record the information in the file 102F as switching history "RECORDING COMPLETED" is displayed (709). If a completion key is depressed, "COMPLETED" is displayed on the screen (710).

The configuration of the network which is necessary for a line switching unit to perform an automatic switching and operation of the line control unit and the line switching units will be described in detail with reference to FIGS. 8, 9-1 and 9-2.

Figure 8:
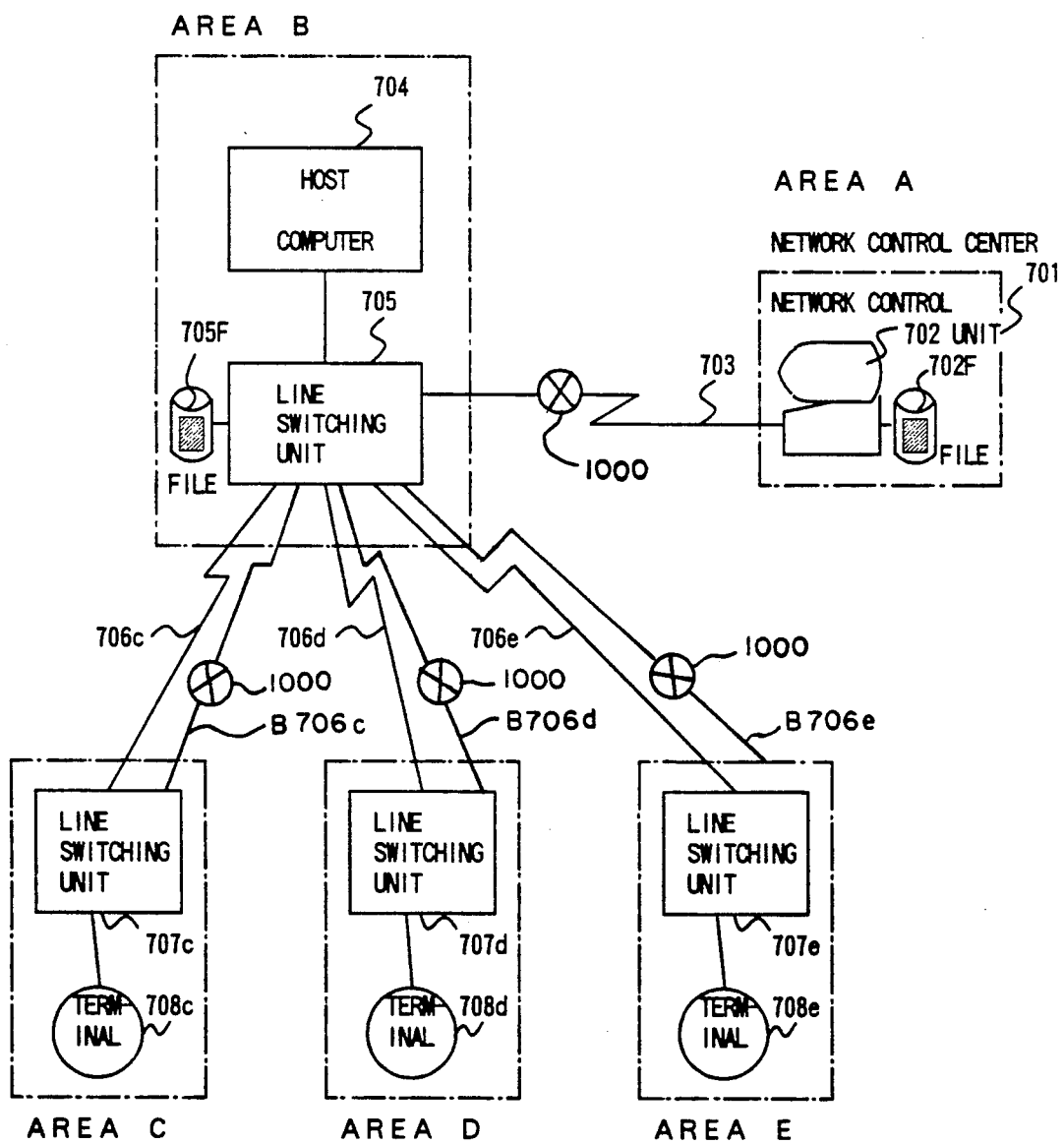
FIG. 8 is a diagram of network configuration showing another embodiment of the present invention.

FIG. 8 is a block diagram showing an embodiment of a network in the case where a line switching unit performs an automatic switching from lines 706c, 706d, and 706e to backup lines B706c, B706d, and B706e, respectively.

A network control center 701 is provided in an area A. The network control unit 702 has a file 702F in which switching history is registered.

In area B, a host computer 704 is connected with a lines switching unit 705 via a communication line. The line switching unit 705 has a file 705F for registering automatic switching conditions. Line switching units 707c, 707d and 707e and terminals 708c, 708d and 708e are provided in areas C, D and E, respectively. They are connected with the line switching unit 705 via communication lines 706c, 706d and 706e, respectively. The network control unit 702 is connected with the line switching unit 705 via communication lines 703. The communication lines may be ISDN, subscriber's telephone network, DDX-C and leased line, etc.

The network control unit 702 and the line switching unit 705 have capabilities which are identical with those of the embodiment shown in FIG. 1. The line switching unit 705 has a failure condition for carrying out the automatic switching in the file 705F.

Figures 1, 9:
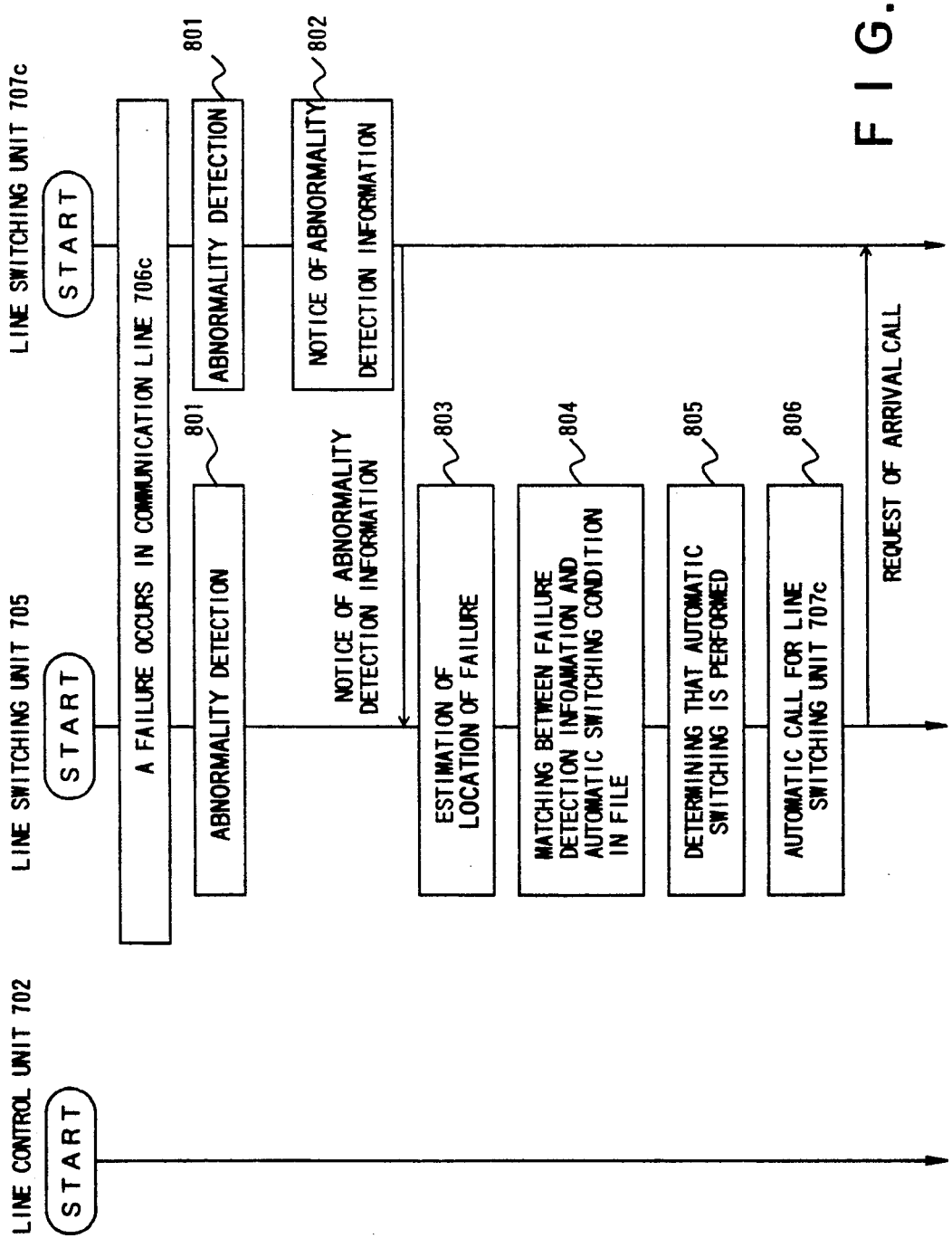
Figures 2, 9:
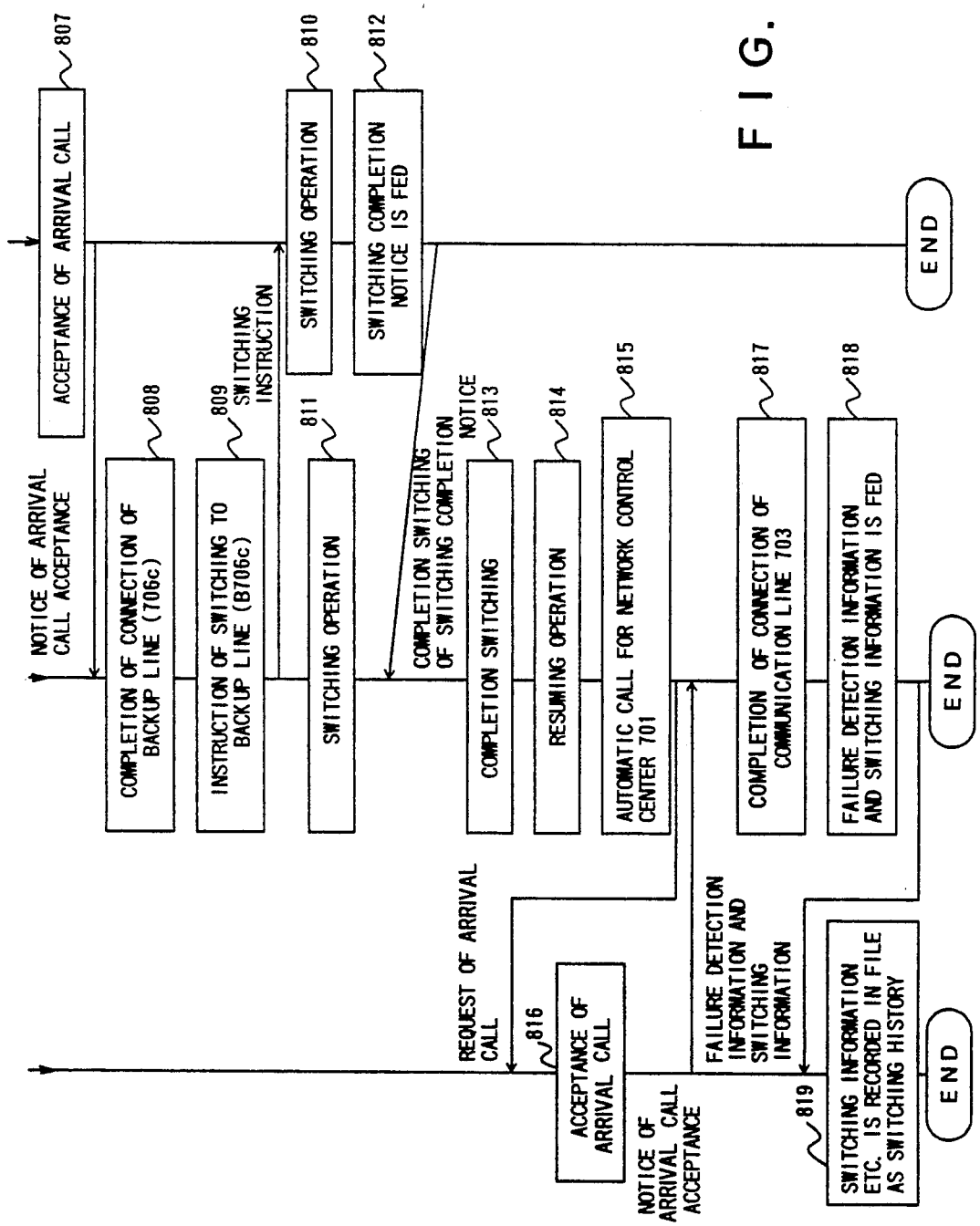

Procedures of the switching operation will be described with reference to FIGS. 9-1 and 9-2, as is done with reference to FIGS. 5A-1 through 5B-2 and 6A-1 through 6B-2.

If the line switching units 705 and 707c detect a failure (801), the line switching unit 707c immediately sends failure detection information and failure information to the line switching unit 705 (802).

The line switching unit 705 receives the failure detection information and the failure information and estimates the locations of the failure based on the received information as well as the failure information which the unit 705 detects and performs matching between the received information and the failure condition in the file 705F for automatic switching. As a result of this, the location of the failure can be substantially restricted on the communication line 706c from the failure information which is obtained this time. If the failure information matches the failure condition in the file for automatic switching, it is determined that an automatic switching is performed (805). The file 705 is preliminarily prepared in the network control center and owned by the line switching unit 705 as a down load.

Subsequently, the line switching unit 705 makes an automatic call for the line switching unit 707c (806). After the line switching unit 707c accepts the arrival call, the line switching unit 705 receives an arrival call accept notice and confirms the completion of the connection of the backup line B706c (808).

The line switching unit 705 transmits to the line switching unit 707c an instruction for switching the communication to backup line B706c (809) and per se performs a switching operation simultaneously with this (861). The line switching unit 707c which receives a switching instruction immediately performs the switching operation (810) and transmits a switching completion notice (812).

The line switching unit 705 receives the switching completion notice and confirms the completion of the switching (813). This resumes the operation (814). An automatic calling to the network control unit 702 is performed (815). An arrival call accept notice from the network unit is received (816). After the connection of the communication line 703 has been confirmed (817), failure detection information and line switching information is transmitted (818).

The network control unit receives the information in interest and records it as switching history in the file 702F (812). The switching operation is thus completed.

There are a plurality of failures such as line failure and node failure for the complicated network as shown in FIG. 1, the connecting destination may be changed for each failure. If the connecting destination is determined by the line switching unit per se to perform the switching, a failure as mis-connection may occur. In case of a simple network as shown in FIG. 8, switching can be performed by the line switching unit per se.

As mentioned above, the line switching unit is capable of restricting the failure locations to one location based upon the failure information and performs the automatic switching only when the failure condition for the automatic switching stored in the file matches the detected failure condition.

As mentioned above, in accordance with the embodiments of the present invention, a network control unit has, in a table, information on the connecting source and destination of communication lines and backup lines and information on a plurality of groups of lines which are grouped based upon the former information in a network system in which a plurality of nodes are connected with each other via line switching units, communication lines and backup lines, and the network control center is connected with the line switching unit. When a failure occurs in the communication line, the network control unit feeds to the line switching unit an instruction for collectively switching the lines belonging to the plurality of groups by selecting the relevant groups based upon the information on the groups. The network control unit has capabilities of performing an analysis on the information on the failure fed from the line switching unit and the restriction of the failure locations and displaying all the relevant failure locations on the screen. It is apparent from the foregoing that centralized control for line switching and line recovery from a remote location and simplification of the switching operation can be realized.

The line switching unit has capabilities of monitoring the conditions of the nodes (between the line switching units and the line switching units and between the line switching unit and the nodes) and the nodes, detecting a failure which occurs and predicting the location of the failure and feeding failure information to the network control unit. The network control unit analyzes the detected information and estimates the location of the failure and displays the relevant location of the failure and a plurality of switching patterns on a screen so that an accurate and fast line switching and the recovery system is realized.

The line switching unit has a capability of performing an automatic switching to relevant backup lines in response to a predetermined failure so that fast and simple line switching operation is achieved.

We claim:

1. In a network system in which a first line switching unit and a second line switching unit are connectable with each other via communication lines and backup lines, and two terminal nodes representative of computes and/or terminal devices are connected with both said first and second line switching units so that said terminal nodes can communicate with each other via both line switching units and either one of said communication and backup lines, a line switching system wherein
a network control unit is connectable with said first line switching unit, said network control unit including a table holding information on connecting mates of said communication and backup lines and information on a plurality of groups of communication lines each group being configured based upon the former information, and said network control unit being adapted to select a relevant group from the table based upon the group information in response to a failure of the communication lines or network nodes incorporated in said communication lines, detected by the first line switching unit and reported to the network control unit for issuing an instruction to the first line switching unit for collectively switching a plurality of communication lines belonging to the group, whereby said first line switching unit in cooperation with said second line switching unit performs switching to the corresponding backup lines.

2. A line switching system according to claim 1 said line switching units include means for monitoring the conditions of said communication lines, and means for transmitting failure information to said network control unit via a transmission network when said line switching units detect a failure and switch connected communication lines to the backup lines.

3. A line switching system according to claim 1 said network control unit includes means for receiving failure detecting information from said line switching units, means for analyzing the received failure detecting information, and means for displaying all relevant locations of the failure on a display screen of said network control unit.

4. A network system in which a first line switching unit and a second line switching unit are connectable via at least one communication line and at least one backup line, and a terminal node representative of a computer or a terminal device is connected with the first or second line switching unit so that two terminal nodes can communication with each other via the first line switching unit, the second line switching unit and either one of said communication and backup lines, said network system comprising:

a network control unit connectable with said first line switching unit including a table representing connecting mates of said communication and backup lines, a plurality of groups of said connecting mates being registered on the table in accordance with a plurality of groups of communication lines, each of said groups representing a scheme to switch over a group of communication lines to a group of corresponding backup lines, and said network control unit being adapted to select a relevant group from the table in response to a failure forth communication lines or network nodes incorporated in the communication lines detected by the first line switching unit and reported to the network control line for issuing an instruction to the first line switching unit for collectively switching a plurality of communication lines belonging to the group; and said first line switching unit in response to the instruction from the network control unit switching over the selected group of communication lines to the group of corresponding backup lines in cooperation with said second line switching units.

5. A network system comprising:

a first line switching unit connected to a first terminal node;

a second line switching unit connected to a second terminal node;

communication lines for connecting the first line switching unit and the second line switching unit, to place the first and second terminal nodes in data communication;

backup lines for connecting the first line switching unit and the second line switching unit when a failure of the communication lines occurs; and, a network control unit connectable with said first line switching unit, said network control unit including, a table for registering,
  (i) connection definitions for each of the communication lines and the backup lines,
  (ii) a plurality of communication line groups formed from the communication lines, the communication line groups representing predetermined switching patterns of the communication lines,
  (iii) a plurality of backup line groups formed from the backup lines, the backup line groups representing predetermined switching patterns of the backup lines, each of said groups representing a scheme to switch over a group of communication lines to a group of corresponding backup lines, selecting means for selecting relevant groups from the table in response to a failure of the communication lines detected and reported to the network control unit by the first line switching unit, and, issuing means for issuing an instruction to the first line switching unit to collectively switch a plurality of communication lines and backup lines belonging to the relevant groups, wherein in response to the instruction from the network control unit the first line switching unit in cooperation with said second line switching unit, switches over the selected group of communication lines to the group of corresponding backup lines.

* * * * *

UNITED STATES PATENT AND TRADEMARK OFFICE
CERTIFICATE OF CORRECTION

PATENT NO. : 5,226,037

DATED : July 6, 1993

INVENTOR(S) : Shigeki Satomi, et al.

It is certified that error appears in the above-identified patent and that said Letters Patent is hereby corrected as shown below:

Claim 4, column 12, line 7, delete "forth" and substitute therefor --of the--; and, line 11, delete the first occurrence of "line" and replace it with --unit--.

Signed and Sealed this

Fifteenth Day of March, 1994

Attest:

BRUCE LEHMAN

Attesting Officer

Commissioner of Patents and Trademarks